United States Patent
Stäubli et al.

(10) Patent No.: US 10,272,523 B2
(45) Date of Patent: Apr. 30, 2019

(54) METHOD FOR CONTINUOUSLY CONVEYING AND BUTT-WELDING SHEET METAL PARTS AND USE OF SAID METHOD

(71) Applicant: ANDRITZ Soutec AG, Neftenbach (CH)

(72) Inventors: Daniel Stäubli, Wettingen (CH); Jean-Frédéric Clerc, Bülach (CH); Andri Janett, Winterthur (CH)

(73) Assignee: Andritz Soutec AG, Neftenbach (CH)

( * ) Notice: Subject to any disclaimer, the term of this patent is extended or adjusted under 35 U.S.C. 154(b) by 407 days.

(21) Appl. No.: 14/911,536

(22) PCT Filed: Aug. 27, 2013

(86) PCT No.: PCT/CH2013/000152
§ 371 (c)(1),
(2) Date: Feb. 11, 2016

(87) PCT Pub. No.: WO2015/027346
PCT Pub. Date: Mar. 5, 2015

(65) Prior Publication Data
US 2016/0184929 A1 Jun. 30, 2016

(51) Int. Cl.
*B23K 37/04* (2006.01)
*B23K 26/08* (2014.01)
(Continued)

(52) U.S. Cl.
CPC ............ *B23K 26/24* (2013.01); *B23K 26/032* (2013.01); *B23K 26/0838* (2013.01);
(Continued)

(58) Field of Classification Search
CPC ............ B23K 37/0408; B23K 26/0838; B23K 26/0846; B23K 26/0869; B23K 26/26; B23K 26/211; B23K 26/032; B23K 26/24
See application file for complete search history.

(56) References Cited

U.S. PATENT DOCUMENTS 4,925,012 A 5/1990 Guntensperger
5,023,427 A * 6/1991 Neiheisel ............... B23K 26/26
219/121.31
(Continued)

FOREIGN PATENT DOCUMENTS

EP 0450349 10/1991
EP 0743133 11/1996
(Continued)

OTHER PUBLICATIONS

PCT International Search Report No. PCT/2013/000152, dated Aug. 8, 2014.
(Continued)

*Primary Examiner* — Ibrahime A Abraham
*Assistant Examiner* — John J Norton
(74) *Attorney, Agent, or Firm* — Cooper & Dunham LLP

(57) ABSTRACT

To increase cycle time, and therefore to lower production costs, in the industrial production of welded sheet metal parts—in particular tailored blanks for the automotive industry—the invention describes a method based on a constant-speed conveying system and a flying optics system, which method manages without complex cooling of the hot weld seam and uses means for holding the workpieces on one side with a high force on the conveyor belt. In this way it is possible greatly to reduce the negative influence the blank spacing has on the cycle time of the machine. Overall, fewer drives are required in the machine and it is possible for a simplified machine concept to be employed without detriment to the quality of the blanks to be welded.

13 Claims, 5 Drawing Sheets

Figure 1:
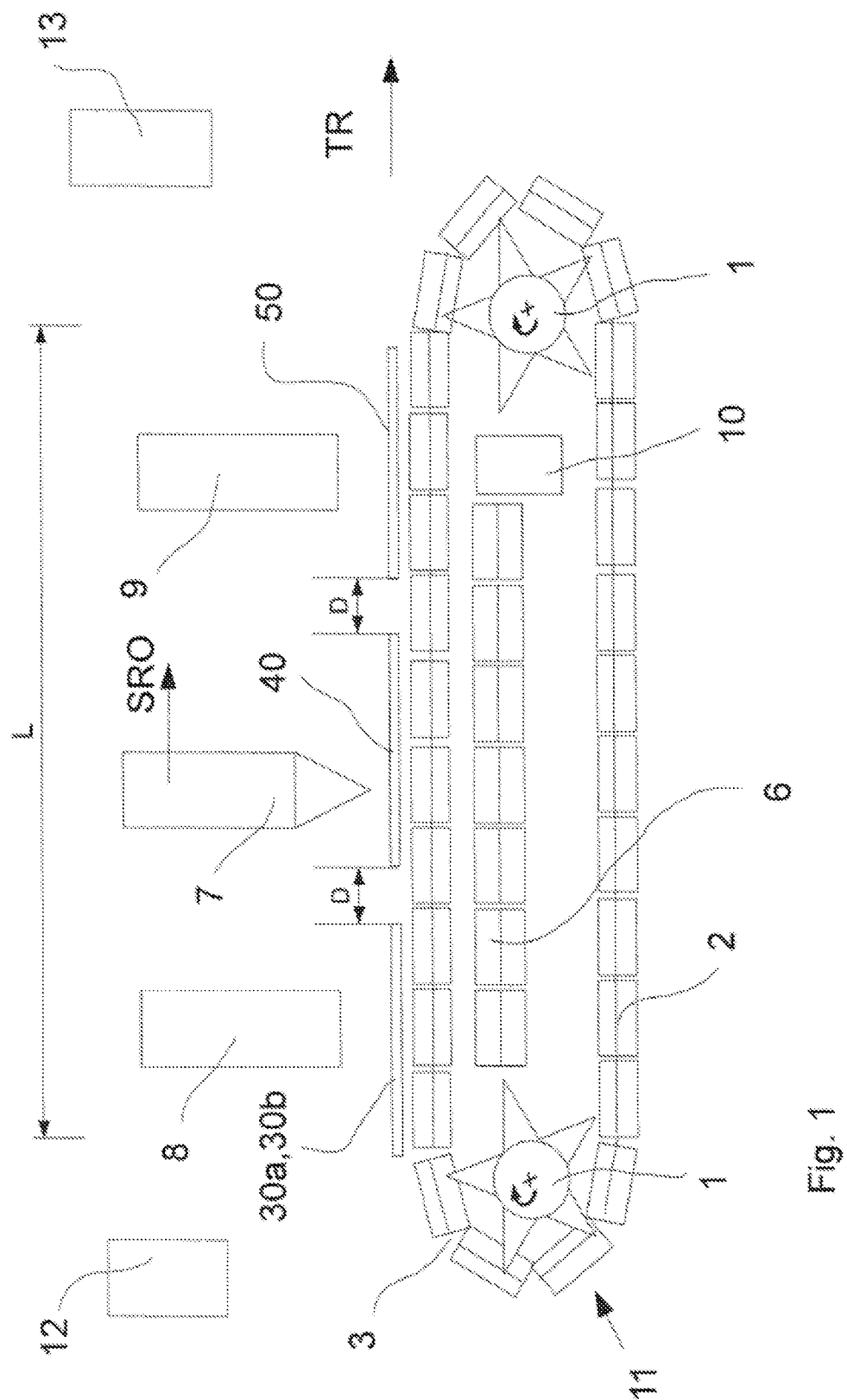

(51) Int. Cl.
  *B23K 26/26* (2014.01)
  *B23K 26/03* (2006.01)
  *B23K 26/24* (2014.01)
  *B23K 26/211* (2014.01)
  *B23K 101/00* (2006.01)
  *B23K 101/18* (2006.01)

(52) U.S. Cl.
  CPC ...... *B23K 26/0846* (2013.01); *B23K 26/0869* (2013.01); *B23K 26/211* (2015.10); *B23K 26/26* (2013.01); *B23K 37/0408* (2013.01); *B23K 2101/006* (2018.08); *B23K 2101/18* (2018.08); *B23K 2101/185* (2018.08)

(56) References Cited

U.S. PATENT DOCUMENTS

| | | | | |
|---|---|---|---|---|
| 5,229,571 | A | * | 7/1993 | Neiheisel ............... B23K 26/10 219/121.63 |
| 5,328,083 | A | | 7/1994 | Peru et al. |
| 5,878,944 | A | | 3/1999 | Aebersold et al. |
| 6,034,347 | A | * | 3/2000 | Alber ................. B23K 15/0006 219/121.63 |
| 2007/0240325 | A1 | * | 10/2007 | Pelsue ...................... B41M 5/24 33/707 |
| 2009/0302011 | A1 | | 12/2009 | Behr et al. |
| 2013/0283592 | A1 | | 10/2013 | Maisch |

FOREIGN PATENT DOCUMENTS

| | | | |
|---|---|---|---|
| EP | 1110662 | | 6/2001 |
| EP | 0817698 | | 9/2001 |
| JP | 48-10777 | | 2/1973 |
| JP | 57081984 | A * | 5/1982 |
| JP | 63-154531 | | 10/1988 |
| JP | 200514027 | | 1/2005 |
| JP | 2007283337 | | 11/2007 |
| JP | 2009525186 | | 7/2009 |
| WO | 2012041453 | | 4/2012 |

OTHER PUBLICATIONS

Office Action for Korean Application No. 10-2016-7004412, dated Oct. 23, 2018.

* cited by examiner

METHOD FOR CONTINUOUSLY CONVEYING AND BUTT-WELDING SHEET METAL PARTS AND USE OF SAID METHOD

CROSS REFERENCE TO RELATED APPLICATIONS

This application is a § 371 national stage of PCT International Application No. PCT/CH2013/000152, filed Aug. 27, 2013, the contents of which is incorporated herein by reference in its entirety.

The present invention relates to a method for continuously conveying and butt-welding of metal sheets, in particular in the construction of vehicle bodies in the automotive industry, according to the preamble of claim 1, as well as a use of said method.

For the production of sheet metal parts in the construction of vehicle bodies, modern manufacturing methods are used to produce welded parts, so-called tailored blanks, from individual metal sheets—possibly after preparation of sheet metal edges. In known welding methods, in particular in laser welding, there are two known methods. In a first method, metal sheets are exactly positioned, tightened, and welded discontinuously by a movable welding head. In the other method, metal sheets are supplied from two mutually interlocking paths to a stationary welding tool and welded. Both methods require a great deal of effort with respect to mechanical precision in order to achieve a gap width of about 0.15 mm. Patent U.S. Pat. No. 5,328,083 describes a method and a device for carrying out the method, wherein however it is not disclosed how the exact positioning of the welding tool with respect to the current seam contour takes place. Here, inaccuracies of the sheets and positional displacements of the seam contour may lead to faulty weld seams.

During welding, a force is produced by the hot weld seam, and this in turn causes that a gap is formed at the end of the weld seam. To avoid this effect, the sheet metal must be held with a high force, or the weld seam must, as a rule, be cooled with water directly after welding. For this purpose, a control device and a cooling device are provided, which, however, require a considerable overall equipment-related expenditure and therefore massively increase the investment costs of such a tailored blank welding machine.

The European patent EP 0450349 relates to a method for the continuous welding of strips or sheets, which are guided into contact, without supplying additional materials by means of a laser beam, wherein the strips are cooled directly after the weld focus in the region of the weld seam in the running direction of the strip in dependence on the width of the gap formed by the abutting edges. In this publication, a device is also proposed for continuously welding strips or sheets, which are guided into contact, by means of a stationary laser beam, said device having tightening rollers on both sides of the strips to be welded arranged in pairs perpendicular to the running direction, which rollers form a gap in the region of contact of the strips, through which the stationary laser beam makes contact when welding the abutting edges.

In the European patent EP 0817698 B1, a method for the continuous butt-seam welding of metal sheets is described, in which the relative position of the metal sheets and thus the accuracy of the weld groove is held within a predetermined tolerance range. Here, a mechanically precise alignment of the sheets to be welded together is deliberately avoided and instead, the beam welding tool is tracks the sheet metal joint of the two metal sheets by means of sensors for the continuous determination of the gap width. In addition, the output of the welding beam and the required cooling capacity for the welding process (gas, water) can be constantly adjusted with a control loop. Such a system requires a high level of maintenance.

A challenge in the welding of tailored blanks is the respective tightening of the blanks. This challenge is solved differently depending on the machine design. On the one hand—as mentioned above—the weld seam in a continuous system is cooled immediately after welding. On the other hand, methods are also known, wherein the blanks are tightened in between two chains. Disadvantageous in such a machine are the lack of accessibility from above and the problem of contamination by welding residue from the machine. In particular in the welding of blanks with a non-rectangular layout (for example a 3-sided or 5-sided layout), non-productive idling times occur between the welding of two weld seams, causing a disadvantageous effect on the cycle time of the machine and thus also on production costs.

As another possibility for a reliable tightening should be mentioned the tightening of blanks on static magnets. However, to meet the high cycle time requirements of such a system, these magnetic shuttles must be moved in rotation, and electromagnets must be used for the loading and unloading of the blanks. Thus, a power supply would need to be ensured for such a rotating system, a technical challenge with correspondingly high investment costs.

Important criteria in a method for welding tailored blanks are, on the one hand, the throughput of the entire system, i.e. how many parts can be produced per hour, and on the other hand, the effort in order to ensure both the quality of the overall manufacturing process as well as the desired quality of the welded blanks with reasonable technical complexity.

Disadvantages of the aforementioned solutions are the high technical complexity for the cooling of the weld seam, for the reliable tightening of the sheet metal, for the removal of welding smoke and weld splashes from the system and the capacity and thus the productivity of the entire system. Generally, in such a system either the welding lens is designed as mobile and the blanks to be welded are at rest, or the weld metal is continuously fed and the welding lens is stationary during the welding process. A further disadvantage is the not-insignificant cost of loading and unloading the conveyor belts.

The object of the present invention is therefore to provide a method in which the aforementioned disadvantages are eliminated.

This object is achieved by the features indicated in claim 1. Advantageous embodiment variants are specified in the dependent claims.

The invention presented here enables the efficient and reliable industrial production of tailored blank parts in a continuous process, whereby the blanks are tightened only from one side—from below—by means of a magnetic principle, whereby the accessibility to the machine from above is ensured. This has a positive influence on the maintainability of the machine, as the resulting welding smoke and weld splashes can be removed easily from above. Because the blanks are fixed reliably over a long transport path, a mobile or "flying" lens can be used, whereby the capacity of the machine can be increased by up to 40% in comparison with other machines with conventional concepts. The loading and unloading of the machine is possible by means of electromagnets and in addition, the magnetic retention principle has a positive effect on maintaining as small a gap as possible between the blanks to be welded, whereby a better quality weld seam can be achieved. The overall result is a simplified machine design of the entire system.

In general, better productivity is thus achieved with the presented method in comparison with other known methods.

The present invention is explained in more detail below by means of embodiments with reference to drawings.

Figure 2:
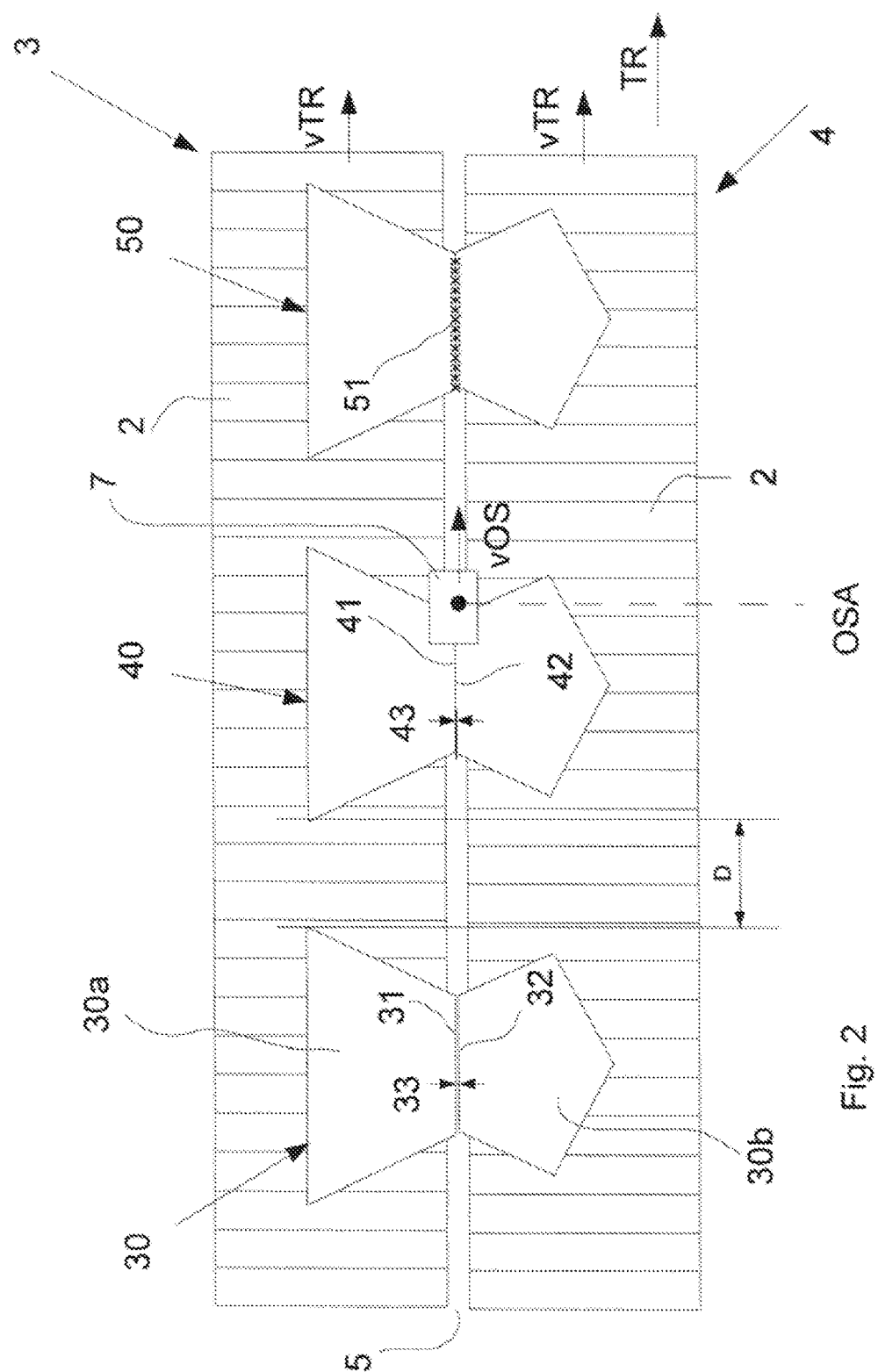
Figure 3:
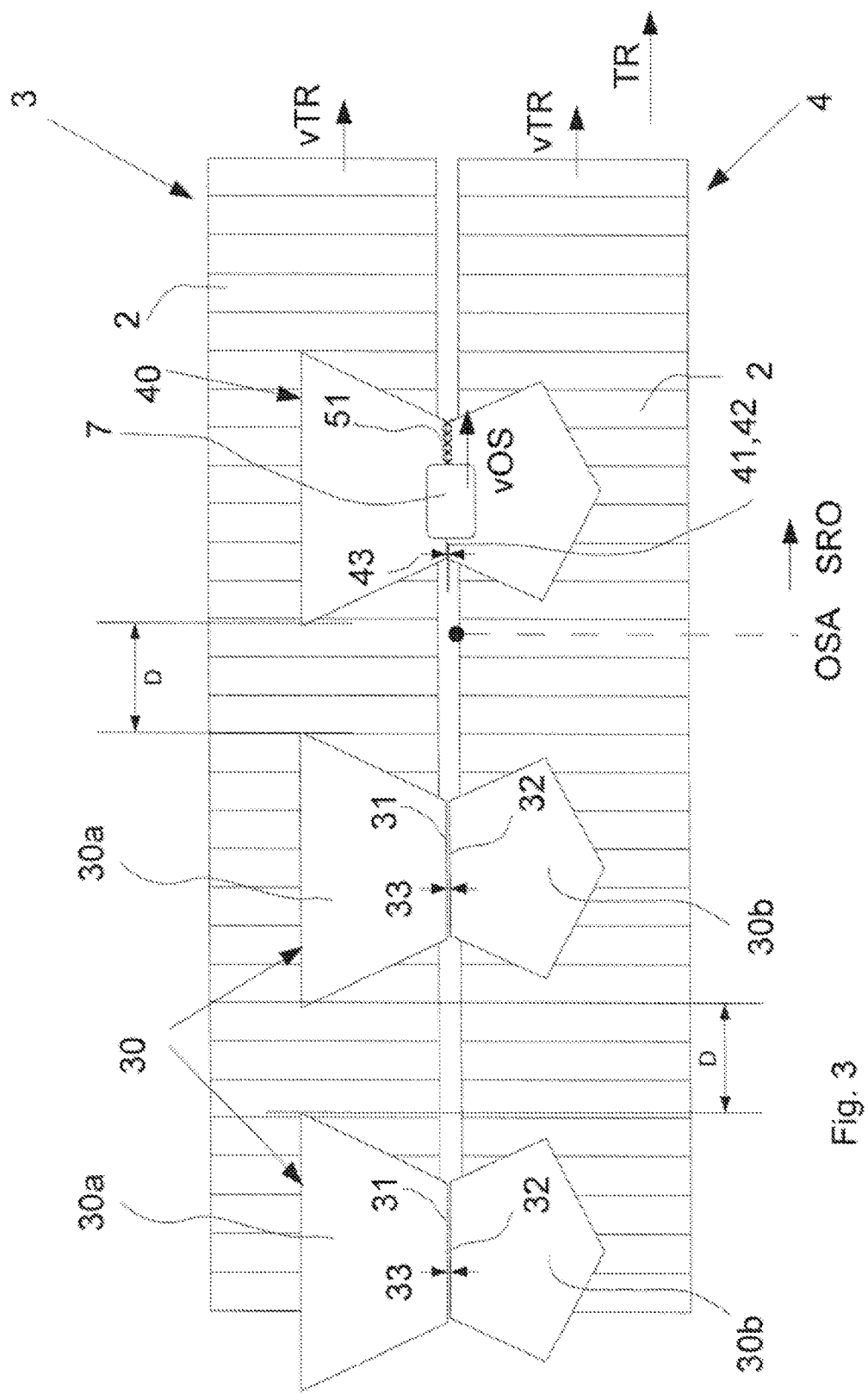
Figure 4:
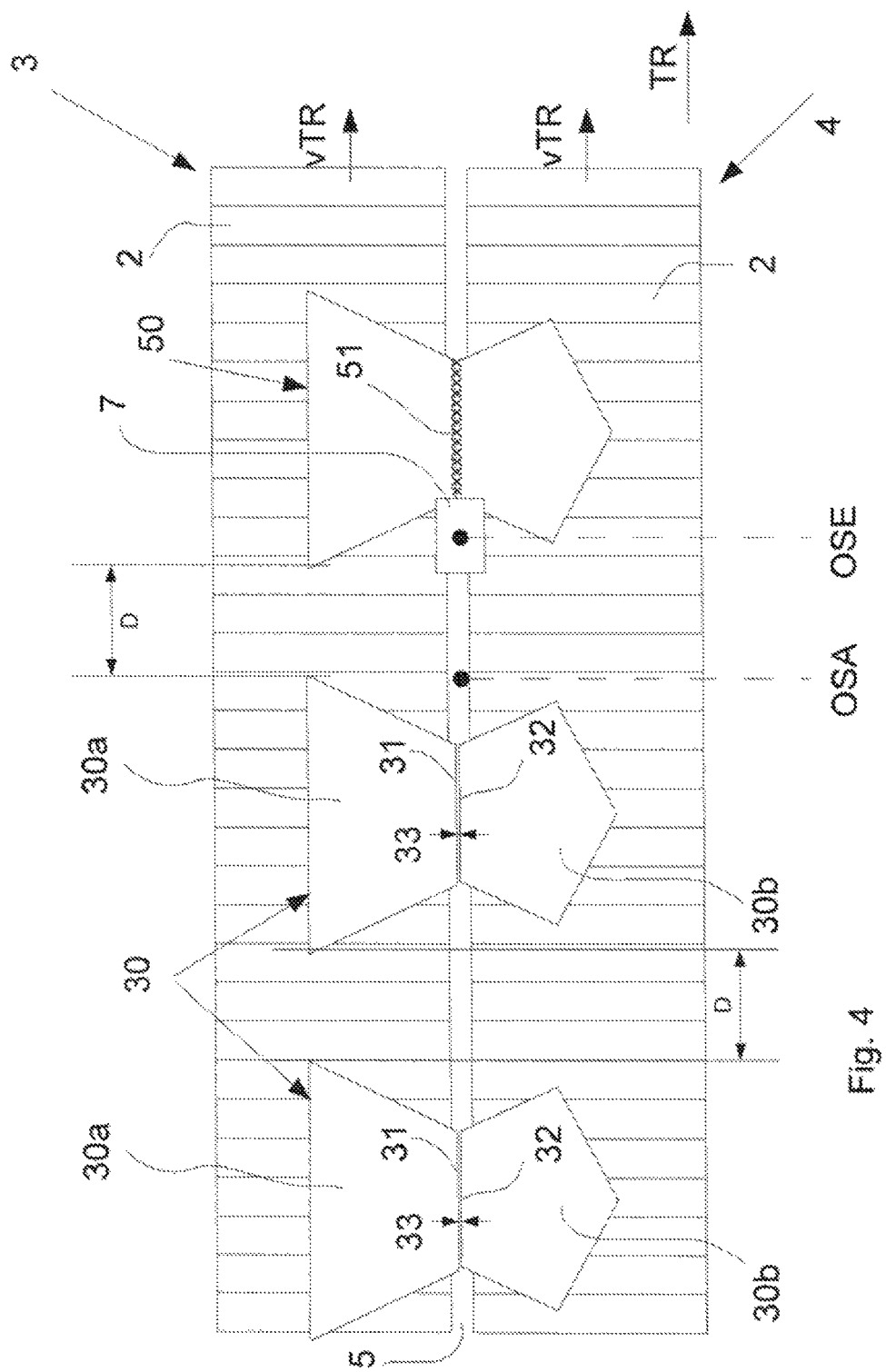
Figure 5:
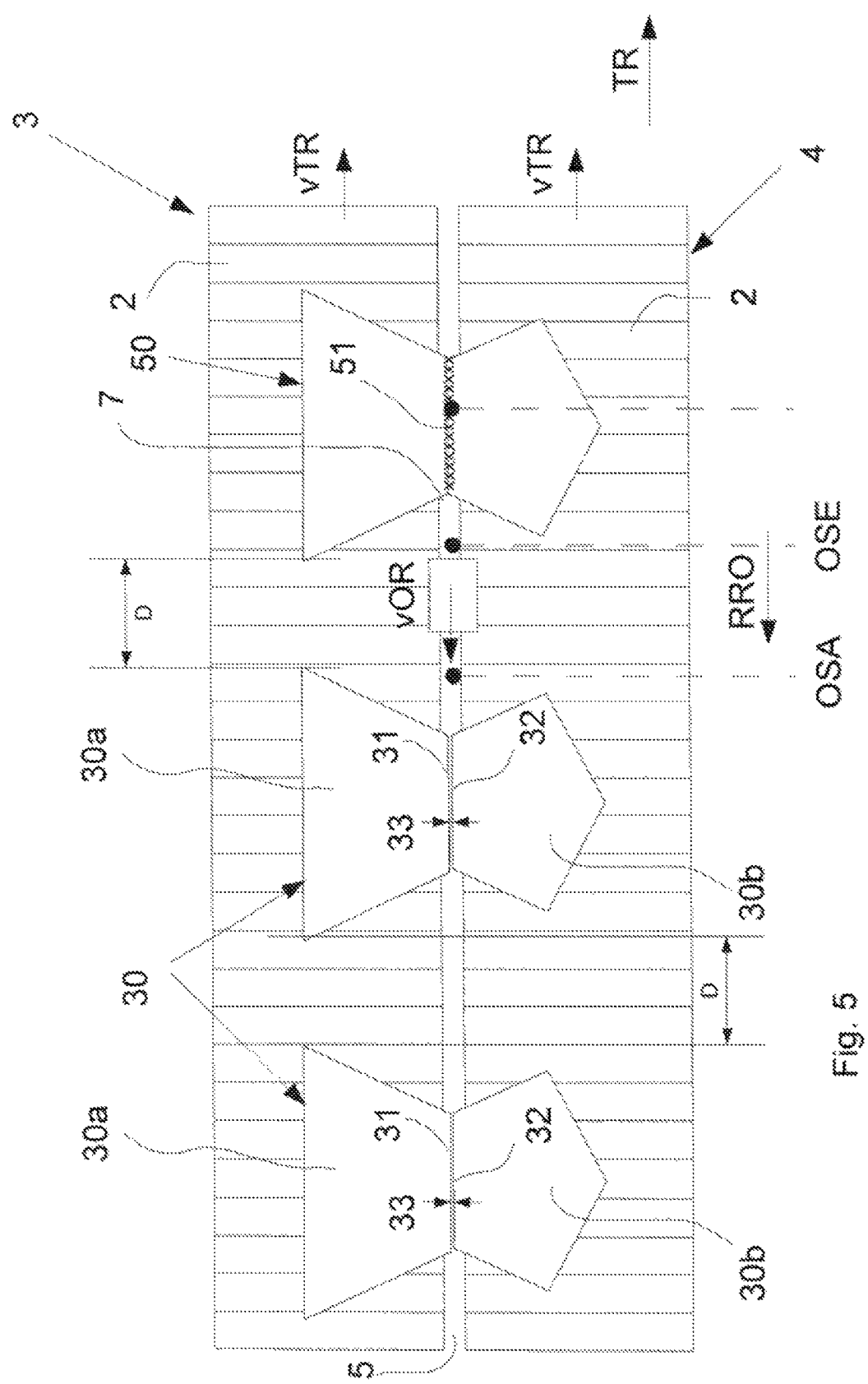

FIG. 1 shows a schematic representation of an inventive arrangement with conveyor belts in cross-section, FIG. 2 shows a first plan view of the conveyor belts of the inventive arrangement outfitted with blanks at the beginning of welding, again in schematic representation, FIG. 3 shows a second plan view of the conveyor belts of the inventive arrangement outfitted with blanks during welding, again in schematic representation, FIG. 4 shows a third plan view of the conveyor belts of the inventive arrangement outfitted with blanks during welding, again in schematic representation, and FIG. 5 shows a fourth plan view of the conveyor belts of the inventive arrangement outfitted with blanks during return of the welding lens, again in schematic representation.

FIG. 1 shows a magnetic chain conveyor 11 with the endless conveyor belt 3 movable in the conveying direction TR via the drive sprockets 1, the speed $v_{TR}$ of which conveyor belt 3 lies in the range of 1-30 m/min, and the segments 2 of which conveyor belt 3, which are preferably, but not exclusively, designed as circumferential pole plates, form a flat surface over a length L, upon which flat surface magnetizable individual workpieces 30a, 30b are placed in a first process step by means of feeding means 12 and held on the conveyor belt 3 with great force through preferably magnetic holding means 6, whereby a stationary first quality system 8 serves to monitor the position and gap width of the individual workpieces 30a, 30b to be welded. The distance D between the blanks 30a, 30b, 40, 50 is dependent on the layout of the individual workpieces 30a, 30b to be welded, where D can be kept small for rectangular horizontal sections of the individual workpieces 30a, 30b, and must be selected to be larger for, for example, rhomboidal layouts of the individual workpieces 30a, 30b. In a second process step, the individual workpieces 30a, 30b are connected with one another in the welding direction SRO in a material-locking manner into a welded blank 50 by means of the movable welding lens 7, whereby the quality of the weld seam is checked with a second stationary quality system 9 from above and optionally with an additional stationary camera 10 from below. When the belt has traveled the length L, the welded blank 50 is removed from the continuously running conveyor belt 3 in a third process step by means of means 13 for removing welded blanks after the previous release of the holding means 6.

FIG. 2 shows a first plan view of the start of the welding process. The two conveyor belts 3, 4, each consisting of the segments 2, separated by the gap 5 both move continuously in the conveying direction TR at the same speed $v_{TR}$. The blank before welding 30, consisting of the individual workpieces 30a, 30b to be welded, is fixed in the region of the edges 31, 32 on the conveyor belts 3, 4 with formation of the smallest possible gap 33. The blank being processed 40 has a minimal gap 43 in the region of the edges 41, 42—due to cutting tolerances—and the welding lens 7 is positioned in the initial position OSA. The already-welded blank 50 is provided with a weld seam 51 and can be removed from the conveyor belts in a following process step.

FIG. 3 shows a second plan view of the welding process. The welding lens 7 moves with a speed $v_{OS}=v_{TR}-v_S$ in the same direction SRO as the conveying direction TR of the conveyor belts 3, 4 and welds the blank being processed 40 in the region of the edges 41, 42, which are separated from one another by a minimal gap 43—present due to cutting tolerances—possibly by supplying filler wire. The welding lens 7 has moved from the position at the beginning of the weld seam OSA in the conveying direction TR. The two not yet welded blanks 30 are positioned for a subsequent welding process.

FIG. 4 shows a third plan view of the end of the welding process. The welded blank is supplied with the weld seam 51 and the welding lens is now located in the position at the end of the weld seam OSE.

FIG. 5 shows a fourth plan view of the return of the welding lens 7. After the welding lens 7 has reached the end of the welding position OSE, it moves with the speed $v_{OR}$, which is a multiple of the conveying speed $v_{TR}$, in the direction RRO opposite the conveying direction TR until it has reached the initial position OSA for welding the next blank to be welded 30.

The invention claimed is:

1. A method for conveying and butt-welding sheet metal, in which
flat sheet metal workpieces are placed by a feeder on at least two conveyor belts which are moved continuously in a horizontal direction TR with a constant speed $v_{TR}$, so that two respective to be welded edges of the two individual workpieces are butted together with formation of a gap and fixed with a holder on the surface of the conveyor belts, divided into individual segments, such that the individual workpieces can be held in the same position over a distance L, further with
at least one welding lens for laser welding which is movable longitudinally and in height, and with
a stationary quality sensor for monitoring a seam geometry before welding and for monitoring a weld seam after welding, as well as
a remover unit for removal of the welded workpieces, characterized in that,
during welding of the workpieces, the at least one welding lens is moved with formation of a weld seam with a speed $v_{OS}$ which is equal to the speed $v_{TR}$ of the conveyor belts reduced by a welding speed $v_S$, in a same longitudinal direction as the conveying direction TR, and in that,
after welding of the two individual workpieces into a welded blank, the at least one welding lens is moved with a speed $v_{OR}$, a multiple of the speed $v_{TR}$ of the conveyor belts, in a direction opposite the conveying direction TR to a starting point OSA of a next seam to be welded.

2. The method according to claim 1, characterized in that the conveyor belts are driven by a chain drive via at least one drive sprocket, wherein the individual segments of the conveyor belts are designed as pole plates.

3. The method according to claim 1, characterized in that the holder is formed as an immobile magnetic holder, or as a vacuum module.

4. The method according to claim 3, characterized in that the magnetic holder comprises permanent magnets or switchable permanent magnets or electromagnets.

5. The method according to claim 1, wherein the holder comprises electromagnets, characterized in that, for fixing the individual workpieces to be welded on the conveyor belts, the holder is switched on via a control unit designed to be switched on and off, and is supplied with current, whereby a magnetic flux is generated which is transmitted via the holder to the segments, and for removing the welded blank after welding, the magnetic flux is switched off by switching off the current.

6. The method according to claim 5, characterized in that the magnetic flux is closed via the holder and the segments and the metallic individual workpieces, whereby a force F in the range of 10-12 N/cm2 is exerted on the workpiece such that during conveying the workpiece is fixed on one side from below on the conveyor belts.

7. The method according to claim 1, characterized in that, for fixing the individual workpiece, a magnetic flux is generated which exerts a magnetic force on the individual workpieces, whereby a gap closure between the individual workpieces to be welded takes place.

8. The method according to claim 1, characterized in that the monitoring of the remaining gap between the individual workpieces to be welded occurs by means of a camera, and a gap closure of the gap between the individual workpieces takes place by supplying filler wire between the individual workpieces.

9. The method according to claim 2, characterized in that the chain drive is designed as a belt drive or shuttle drive.

10. The method according to claim 1, characterized in that the sheet metal parts are butt-welded to form tailored blanks for a motor vehicle body.

11. The method according to claim 1, wherein the two individual workpieces are fixed on the surface of the conveyor belts only from below such that an accessibility from above is ensured.

12. The method according to claim 1 used in the construction of motor vehicle bodies in the automotive industry.

13. A method for conveying and laser butt-welding sheet metal workpieces, the method comprising steps of
- by means of a feeder placing the to be welded workpieces onto conveyor belts divided into individual segments,
- moving said conveyor belts continuously in a horizontal conveying direction TR with a constant speed $v_{TR}$,
- butting together two edges of the workpieces with formation of a gap,
- by means of a holder fixing the workpieces on the surface of the conveyor belts only from below such that an accessibility from above is ensure,
- by means of at least one welding lens movable in the horizontal conveying direction and in a vertical direction welding the workpieces thereby forming a weld seam and creating a welded part, wherein during welding the welding lens is moved in the conveying direction TR with a speed $v_{OS}$ which is equal to the speed $v_{TR}$ reduced by a welding speed $v_S$,
- after welding of the workpieces, moving the welding lens to a starting point OSA of a subsequent welding process in a direction opposite the conveying direction TR with a speed $v_{OR}$ which is a multiple of the speed $v_{TR}$,
- by means of a stationary quality sensor monitoring a seam geometry before welding and monitoring the weld seam after welding,
- after releasing the fixation of the welded part, by means of a remover unit removing the welded part from the conveyor belts.

* * * * *